US006185778B1

(12) United States Patent
Ornstedt

(10) Patent No.: US 6,185,778 B1
(45) Date of Patent: Feb. 13, 2001

(54) COMPUTER MOUSE CLEANING APPARATUS

(76) Inventor: Brian Ornstedt, 42 Reilly Ave., Blackstone, MA (US) 01504

( * ) Notice: Under 35 U.S.C. 154(b), the term of this patent shall be extended for 0 days.

(21) Appl. No.: 09/302,237

(22) Filed: Apr. 29, 1999

(51) Int. Cl.[7] .................................................. B08B 9/00
(52) U.S. Cl. ...................... 15/114; 15/104.001; 15/105; 15/106; 15/118; 15/104.16; 15/160; 15/184; 15/210.1; 7/151; 7/170; 81/3.4; 81/488
(58) Field of Search ................... 15/104.001, 104.03, 15/104.05, 104.16, 104.2, 105, 106, 114, 118, 160, 164, 210.1, 211, 184; 7/151, 170; 81/3.4, 52, 488; 206/209, 234, 361, 362

(56) References Cited

U.S. PATENT DOCUMENTS

| 1,950,862 | * | 3/1934 | Page ........................................ 15/106 |
| 4,263,692 | * | 4/1981 | Gremillion .......................... 15/210.1 |
| 4,575,892 | * | 3/1986 | Ross ........................................ 15/106 |
| 4,673,440 | | 6/1987 | Chapin, Jr. ............................... 134/8 |
| 5,491,863 | * | 2/1996 | Dunn ........................................ 15/106 |
| 5,709,003 | * | 1/1998 | Batch ....................................... 15/106 |
| 5,970,559 | * | 10/1999 | Christy .............................. 15/210.1 X |

FOREIGN PATENT DOCUMENTS

| 94355 | * | 8/1969 | (FR) | ......................................... 15/105 |
| 2246698 | * | 2/1992 | (GB) | ................................. 15/104.001 |
| 2268049 | * | 1/1994 | (GB) | ................................. 15/104.001 |

* cited by examiner

*Primary Examiner*—Mark Spisich
(74) *Attorney, Agent, or Firm*—Salter & Michaelson

(57) ABSTRACT

An apparatus for cleaning a computer mouse having a cavity for housing a sphere and a plurality of internal components is disclosed. The apparatus includes a body having a first end and a second end, the body having a handle portion disposed proximate the first end and a cleaning portion disposed proximate the second end, the cleaning portion having a width dimension which is slightly larger than the diameter of the computer mouse sphere and having a surface which includes a number of resilient, deformable hooks. The cleaning portion is inserted into the cavity of the computer mouse and rotated, thereby causing the number of hooks to remove debris from the internal components of the computer mouse. The apparatus further includes a retaining ring removal device which facilitates the removal of a retaining ring of the computer mouse, the retaining ring removal device being disposed at the first end of the body, and an interior cavity which facilitates the storage of accessories within the body. The apparatus also includes a cap which is attachable to the body, the cap covering the cleaning portion when attached to the body.

18 Claims, 4 Drawing Sheets

COMPUTER MOUSE CLEANING APPARATUS

BACKGROUND OF THE INVENTION

1. Field of the Invention

The present invention relates generally to an apparatus for cleaning a computer mouse, and more particularly to an apparatus for removing debris from the interior cavity of a computer mouse.

2. Discussion of the Related Art

As is well known in the art, a computer mouse is a device which is used to move a cursor across a computer screen. A typical mouse includes a housing having a number of buttons on the top and a cavity on the bottom which houses a number of transducers, a sphere for translating movement of the mouse to the transducers and a biasing roller for biasing the sphere into contact with the transducers. The sphere is maintained within the cavity by means of a retaining ring which locks into place in the housing and includes an aperture which allows a small portion of the sphere to protrude therethrough for contacting a surface against which the mouse is slid during use. Due to the aperture in the retaining ring, during use of the mouse, lint and other debris can be pulled into the cavity where it can become entangled or otherwise adhered to the transducers and the biasing roller, thereby degrading the sensitivity of the mouse. Periodic cleaning of the cavity, and particularly the transducers and biasing roller, is necessary to restore the sensitivity of the mouse.

A prior art device for cleaning the cavity of a computer mouse is disclosed in U.S. Pat. No. 4,673,440 to Chapin, Jr. This device includes a hook-covered sphere (such as VELCRO®) which is coated with a solvent and inserted into the cavity of the mouse after the mouse sphere and retaining ring have been removed. The mouse is then moved across a loop-covered surface in order to randomly rotate the sphere inside the cavity to cause the hooks to scrub the transducers. When finished, the user must insert a pin into the sphere in order to pull it out of the cavity. While this apparatus may be effective in cleaning the mouse cavity and transducers, it has several shortcomings. Since the sphere is coated with a solvent before it is inserted into the mouse cavity, the user has no choice but to handle the solvent-coated sphere in order to install it in the mouse cavity. This results in the solvent getting on user's hands. Furthermore, the device requires a number of separate accessories, including a pin for removing the sphere from the mouse cavity, which can be dangerous, a solvent and a special mouse pad on which the hook-covered sphere is rolled. Since all of these accessories are required to use the device, the device is cumbersome to use, is not very portable and can be difficult for people with reduced hand dexterity to use.

What is needed, therefore, is an apparatus for cleaning the transducers and biasing roller of a mouse which is portable, which requires a minimum number of accessories, which is easy to handle and use and which does not require the user to handle solvent-soaked pieces.

SUMMARY OF THE INVENTION

The present invention includes an apparatus for cleaning the transducers and biasing roller of a computer mouse. The apparatus includes a cylindrical body having a handle portion at one end and a cleaning portion at another end thereof. On one end of the apparatus is a high-friction surface for facilitating the removal of the retaining ring. The apparatus also includes an interior storage compartment for storing optional accessories and a cover for protecting the cleaning portion of the apparatus.

According to one embodiment of the invention, an apparatus for cleaning a computer mouse having a cavity for housing a sphere and a plurality of internal components is disclosed. The apparatus includes a body having a first end and a second end, the body having a handle portion disposed proximate the first end and a cleaning portion disposed proximate the second end, the cleaning portion having a width dimension which is slightly larger than the diameter of the computer mouse sphere and having a surface which includes a number of resilient, deformable hooks. The cleaning portion is inserted into the cavity of the computer mouse and rotated, thereby causing the number of hooks to remove debris from the internal components of the computer mouse. The apparatus further includes a retaining ring removal device which facilitates the removal of a retaining ring of the computer mouse, the retaining ring removal device being disposed at the first end of the body, and an interior cavity which facilitates the storage of accessories within the body. The apparatus also includes a cap which is attachable to the body, the cap covering the cleaning portion when attached to the body and a cushion material disposed between the hook material and the body.

According to another embodiment of the invention, an apparatus for cleaning a computer mouse which includes a cavity for housing a sphere and a number of internal components is disclosed, the apparatus having a body including a handle portion and a cleaning portion, the cleaning portion being sized to effect a snug fit within the cavity when the cleaning portion is inserted into the cavity and being constructed and arranged for removing debris from the internal components as the apparatus is moved within the cavity.

Other features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION

Figure 1:
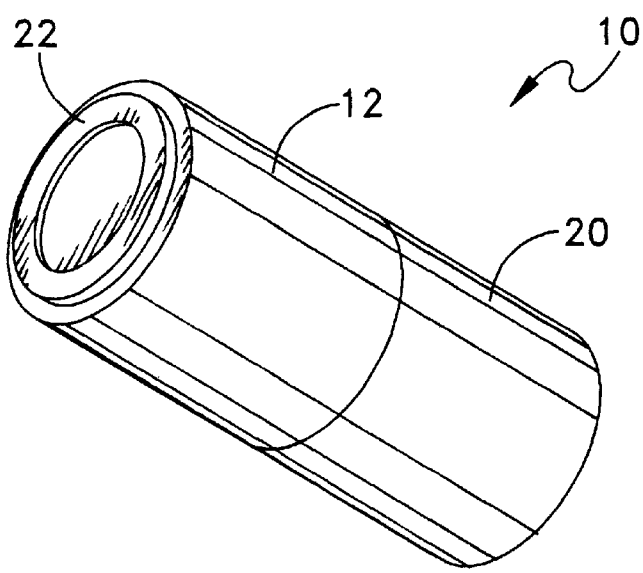
FIG. 1 is a perspective view of the mouse cleaning apparatus of the present invention with the cap installed on the apparatus.
Figure 2:
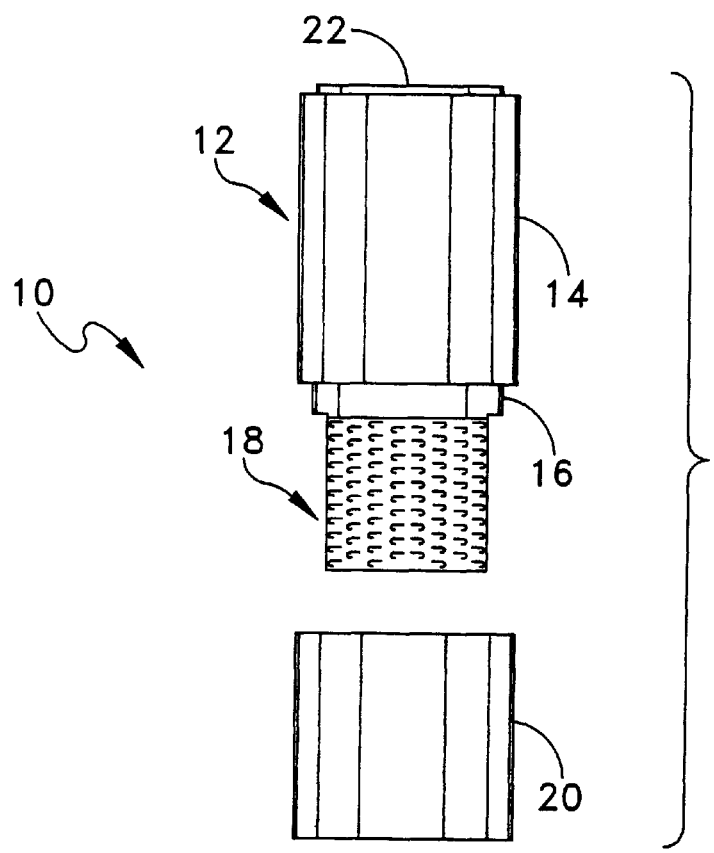
FIG. 2 is a side view of the mouse cleaning apparatus of the present invention, showing the cap removed from the body of the apparatus.

Referring now to the figures, and more particularly to FIGS. 1–3, the mouse cleaning apparatus of the present invention will be described. Generally indicated at 10 is the mouse cleaning apparatus of the present invention. The apparatus 10 includes a body, generally indicated at 12, which includes a handle portion 14, a reduced diameter portion 16 and a cleaning portion 18. A cap 20 is sized so as to effect a friction fit over the reduced diameter portion 16 when the cap 20 is installed over the cleaning portion 18 of the body 12. In the closed configuration, with the cap 20 installed on the body 12, the apparatus has an approximate length of between 2 and 4 inches, and preferably between 2 and 3 inches. Both the body 12 and the cap 20 are preferably formed of plastic by injection molding. However, it will be understood that any suitable manufacturing method may be used to form the body 12 and the cap 20. Disposed at the end of the body 12 opposite the cleaning portion 18 is a retaining ring removing device 22, which is formed from a deformable, high friction-imparting material such as rubber, neoprene, or the like. Device 22 is preferably adhered to the end of body 12 using any type of suitable adhesive.

Cleaning portion 18 includes a strip of a hooked-surface material 24, preferably the hooked portion of VELCRO® material, which is adhered to the cleaning portion 18 of the body 12. In order to accommodate variances in the size of the mouse cavity and the spacing of the transducers and biasing roller, a cushioning material 26, such as closed cellular foam or other like material, is adhered to the cleaning portion 18 of the body 12 under the hooked-surface material 24, which material is then adhered to the cushioning material 26. The cushioning material 26 enables the cleaning portion 18 to deflect in order to fit into mouse cavities of slightly different sizes while providing an appropriate amount of friction between the cleaning portion 18 and the transducers and biasing roller of the mouse.

Figure 3:
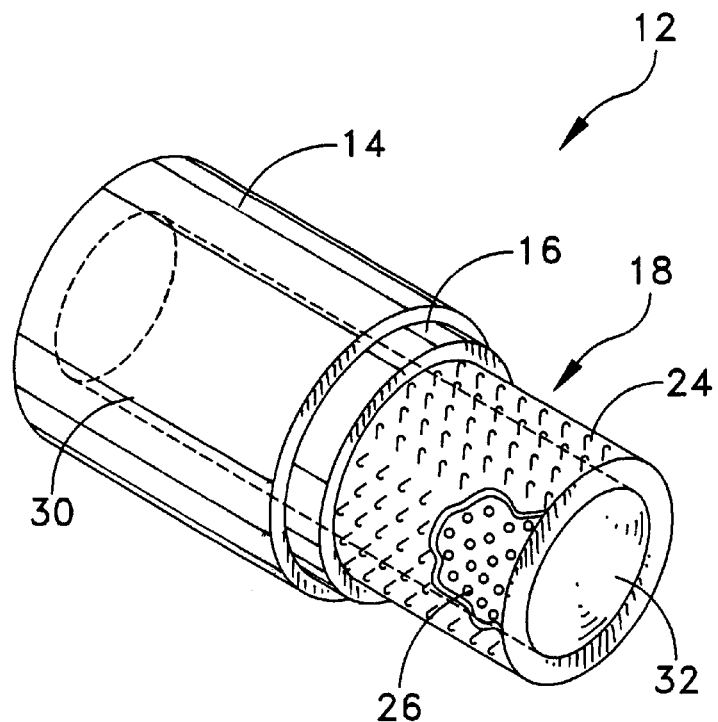
FIG. 3 is a perspective view of the mouse cleaning apparatus of the present invention, showing the interior cavity formed within the body of the apparatus and the opening for the interior cavity and a partial cutaway view of the cleaning portion of the apparatus.
Figure 4:
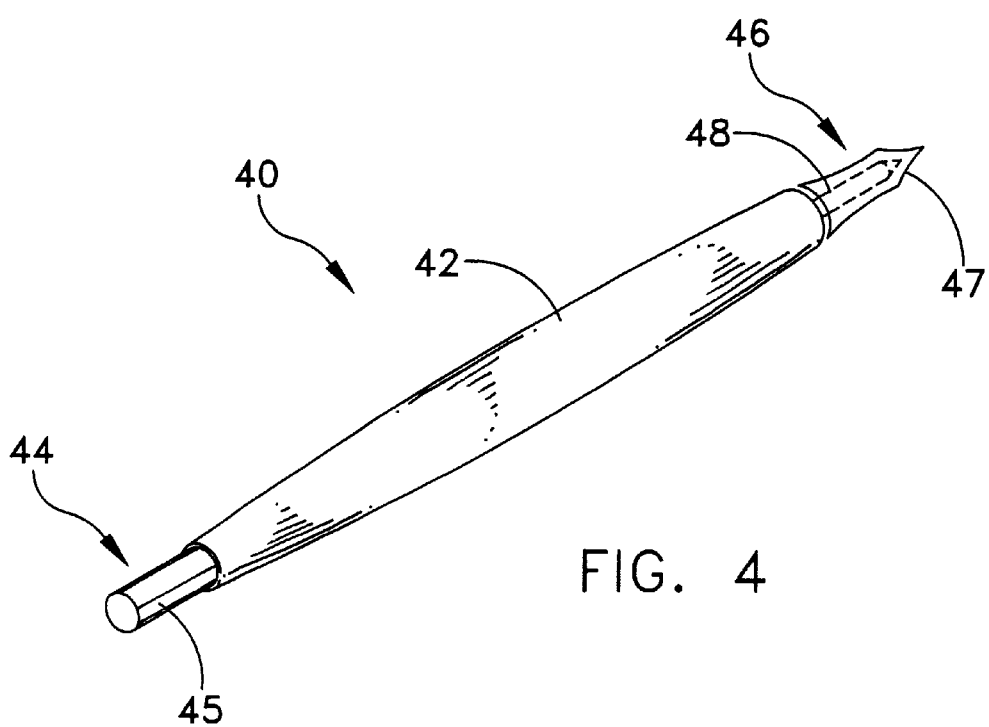
FIG. 4 is a diagram of a dual-ended cleaning tool which may be stored in the interior cavity of the apparatus.

Shown in phantom in FIG. 3 is an interior cavity 30 in which accessories for the apparatus 10 may be stored. The interior cavity 30 includes an opening 32 in the end of the body 12 proximate the cleaning portion 18. The interior cavity may be used to store accessories such as the cleaning tool 40, shown in FIG. 4. Interior cavity 30 may also be used to store other accessories, such as a cloth or a small vile of cleaning solvent (not shown).

Cleaning tool 40 includes a handle 42 having a brush portion 44 disposed at one end thereof and a swab portion 46 disposed at another end of handle 42. Brush portion 44 includes a number of bristles 45 affixed to the end of handle 42 in a conventional manner and swab portion 46 includes a conical head 47, formed from a compressive and somewhat abrasive material such as foam, which is attached to a post 48 (shown partially in phantom) which provides rigidity to the conical head 47. The cleaning tool 40 has a total length which is slightly less than the length of the interior cavity 30, to enable the cleaning tool 40 to be stored within the interior cavity 30 while the cap 20 is installed on the body 12 of the apparatus 10.

Figure 5:
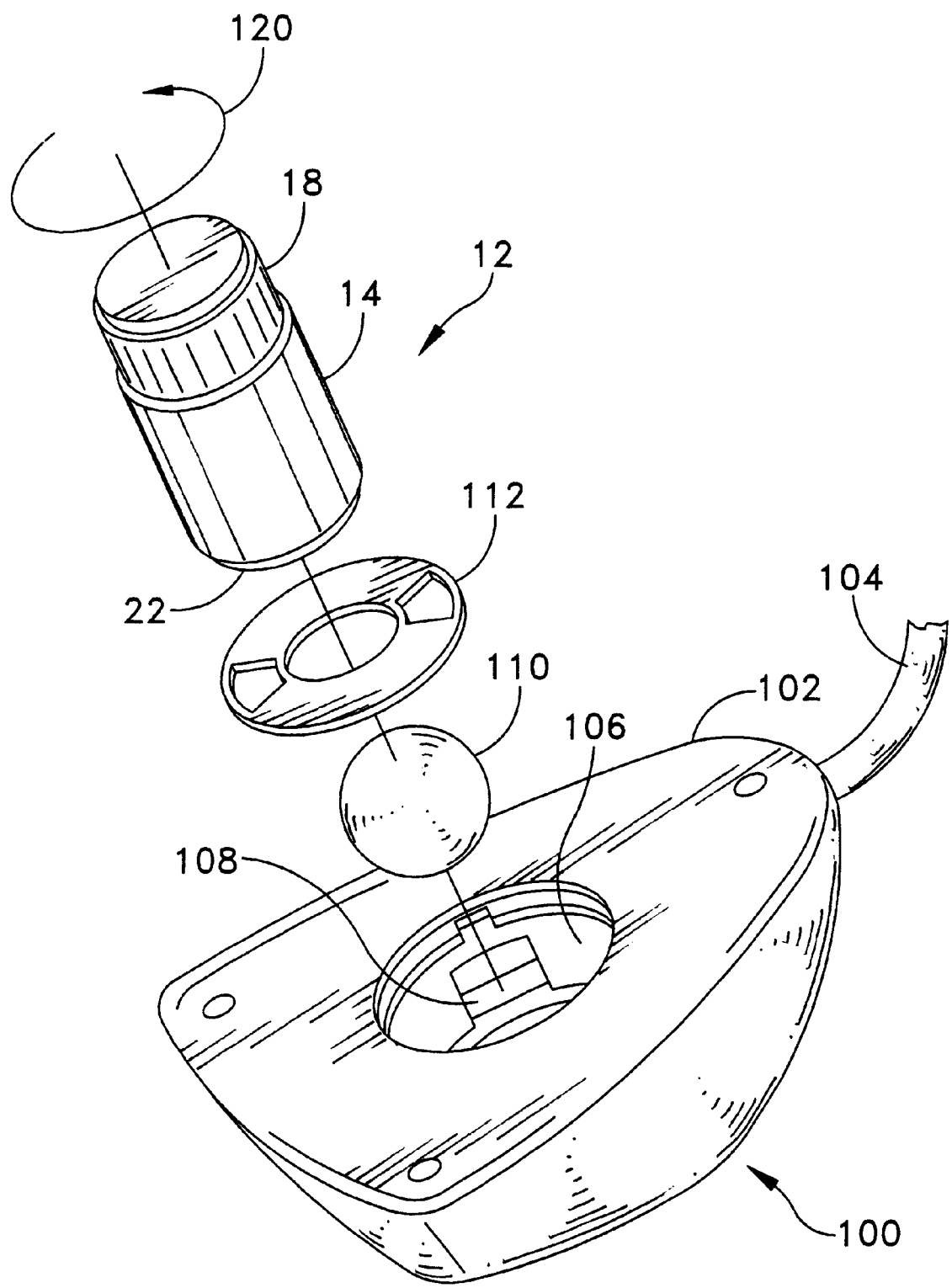
FIG. 5 is a diagram which shows the apparatus being used to remove the retaining ring of the mouse.
Figure 6:
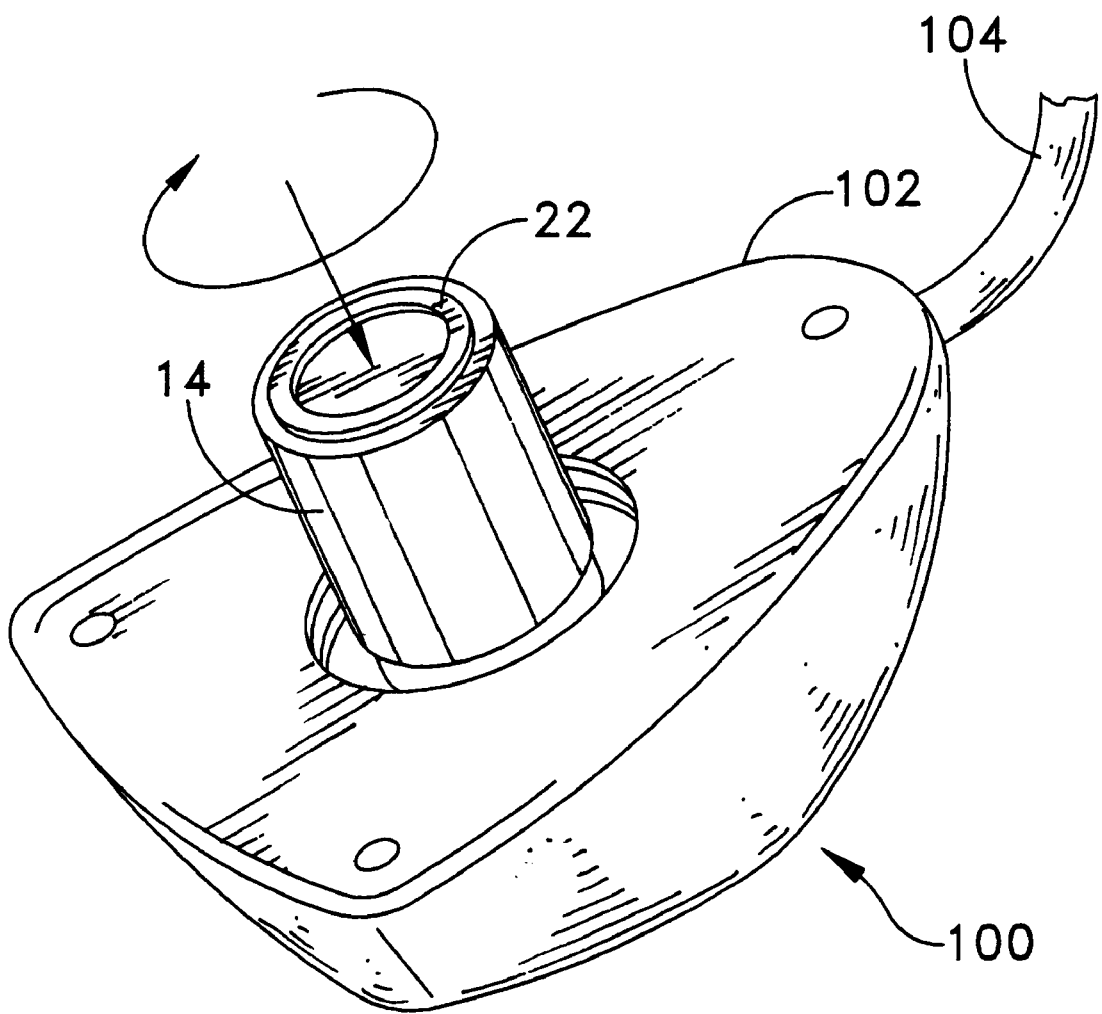
FIG. 6 is a diagram which shows the apparatus being used to clean the mouse cavity.

Referring now to FIGS. 5 and 6, the operation of the apparatus 10 will be described. Shown in FIG. 5 is a mouse, generally indicated at 100, which includes a housing 102, a cable 104, and an interior cavity 106, in which a pair of transducers (one being shown at 108) and a biasing roller (not shown) are disposed. A sphere 110 is also disposed within the cavity 106, the sphere being retained within the cavity 106 by a retaining ring 112 which locks into housing 102 to retain the sphere 110 within the cavity 106. In use, the retaining ring removing device 22 is pressed against the retaining ring and turned in a counter-clockwise direction, as shown by arrow 120 in FIG. 5, in order to unlock the retaining ring 112 from the housing 102. The deformability of the retaining ring removing device 22 allows it to conform to any irregularities in the surface of the retaining ring 112 to provide an increased grip for unlocking the retaining ring 112 from the housing 102. Alternatively, since some "mice" have retainer rings which are locked into place using a sliding motion rather than a rotating motion, the retaining ring removing device 22 may be pressed against the retaining ring while it is slid out of locking engagement with the housing of the mouse. Once the retaining ring 112 is removed, the sphere 110 is removed from the cavity 106.

With the cap 20 removed from the apparatus 10, the cleaning portion 18 of the apparatus 10 is inserted into the cavity 106 of the mouse 100. Due to the cushioning material 26 and the nature of the hooked surface material 24, the cleaning portion 18 is snugly received within the cavity 106, which facilitates the cleaning of the transducers and the biasing roller. Once the cleaning portion is inserted into the cavity 106, as shown in FIG. 6, the apparatus is gripped by the handle portion 14 and rotated in order to allow the hooks of the material 24 to abrade the transducers and the biasing roller. Since most of the debris which is deposited on the transducers and the biasing roller is lint and similar-type debris which can become wrapped around the transducers and biasing roller, the hooks of the hook material are very effective in pulling the debris off of the transducers and the biasing roller. In order to clean the entire surface of each transducer and roller, the apparatus 10 is removed from the cavity 106 and then reinserted and rotated. Every time the apparatus 10 is removed and reinserted into the cavity 106, the transducers and biasing roller rotate, thus exposing a different surface to the cleaning portion 18. Therefore, this procedure may be repeated several times to ensure that the entire surface of each transducer and the biasing roller are cleaned by the cleaning portion 18.

In the case that deposits remain on the transducers or biasing roller, such as oil deposits, or any other substance that can become stuck to the transducers and the biasing roller, the swab 46 of the cleaning tool 40 may be dipped in a cleaning solution and used to wipe the deposits from the transducers and biasing roller. Furthermore, the brush 44 of the cleaning tool 40 may be used to brush any stray debris from inside the cavity 106 of the mouse 100. The brush 44 may also be used to clean debris which has become lodged on the cleaning portion 18 of the apparatus 10. When not in use, the cleaning tool is stored within the interior cavity 30 and the cap 20 is placed on the body 12 of the apparatus 10 to cover the cleaning portion 18 and to retain the cleaning tool 40 within the interior cavity 30.

Based on the foregoing, it can therefore be seen that the present invention provides a convenient and portable apparatus for cleaning a computer mouse. The apparatus includes a cleaning portion for abrading the transducers and biasing roller of the mouse and a handle portion which facilitates the manipulation of the apparatus and allows the user to keep his or hands free of cleaning solvent. The apparatus includes a cleaning tool which is conveniently stored within an interior cavity of the apparatus. A cap is included to both cover the cleaning portion and to secure the cleaning tool within the interior cavity of the apparatus.

While there is shown and described herein certain specific structure embodying the invention, it will be manifest to those skilled in the art that various modifications and rearrangements of the parts may be made without departing from the spirit and scope of the underlying inventive concept. For example, while the invention is described as being for cleaning a computer mouse, it will be understood that the apparatus may also be used to clean other computer input devices which have similar components, such as trackball devices. Furthermore, while the invention is described as being formed of plastic which is injection molded, it will be understood that any material may be used in the manufacture of the apparatus Accordingly, the inventive concept is not limited to the particular forms herein shown and described except insofar as indicated by the scope of the appended claims.

What is claimed is:

1. An apparatus for cleaning a computer mouse having a cavity for housing a sphere and a plurality of internal components, the apparatus comprising:

a body having a first end and a second end, said body including a handle portion disposed proximate said first end and a cleaning portion disposed proximate said second end, the cleaning portion having a width dimension which is slightly larger than the diameter of the computer mouse sphere and having a surface which includes a number of resilient, deformable hooks; and a retaining ring removal device which facilitates the removal of a retaining ring of the computer mouse, said retaining ring removal device being disposed at said first end of said body;

wherein the cleaning portion is insertable and rotatable in the cavity of the computer mouse, thereby causing said number of hooks to remove debris from the internal components of the computer mouse.

2. The apparatus of claim 1, wherein said body further comprises an interior cavity which facilitates the storage of accessories within said body.

3. The apparatus of claim 2, wherein said interior cavity is accessible through an opening in said second end of said body.

4. The apparatus of claim 3, further comprising a cap which is attachable to said body, said cap covering said cleaning portion and sealing said interior cavity when attached to said body.

5. The apparatus of claim 2, further comprising a discrete cleaning tool which is storable within said interior cavity.

6. The apparatus of claim 5, wherein said cleaning tool comprises a handle having a brush disposed at one end thereof and a swab disposed at another end thereof.

7. The apparatus of claim 1, wherein said cleaning portion surface comprises the hook material of a hook- and-loop fastener material attached to said body.

8. The apparatus of claim 7, further comprising a cushion material disposed between said hook material and said body.

9. The apparatus of claim 1, wherein said retaining ring removal device comprises a deformable, high friction-imparting material attached to said body.

10. The apparatus of claim 1, further comprising a cap which is attachable to said body, said cap covering said cleaning portion when attached to said body.

11. The apparatus of claim 1, wherein said body is cylindrical.

12. The apparatus of claim 10, wherein said body further includes a cap receiving portion disposed between said handle portion and said cleaning portion, said cap receiving portion being sized to frictionally receive said cap when said cap is attached to said body.

13. An apparatus for cleaning a computer mouse which includes a cavity for housing a sphere and a number of internal components, the apparatus comprising:

a body including a handle portion and a cleaning portion, the cleaning portion being sized to effect a snug fit within the cavity when the cleaning portion is inserted into the cavity, said cleaning portion being constructed and arranged for removing debris from the internal components as the apparatus is moved within the cavity; and a retaining ring removal device which facilitates the removal of a retaining ring of the computer mouse, said retaining ring removal device being disposed proximate said handle portion.

14. The apparatus of claim 13, wherein said cleaning portion comprises and abrasive surface for scrubbing the internal components.

15. The apparatus of claim 14, wherein said abrasive surface comprises a plurality of resilient, deformable hooks.

16. The apparatus of claim 13, wherein said body further comprises an interior cavity which facilitates the storage of accessories within said body.

17. The apparatus of claim 16, further comprising a cap which is attachable to said body, said cap covering said cleaning portion and sealing said interior cavity when attached to said body.

18. The apparatus of claim 13, further comprising a cap which is attachable to said body, said cap covering said cleaning portion when attached to said body.

* * * * *